Patented Apr. 29, 1930

1,756,228

UNITED STATES PATENT OFFICE

JOHN P. TRICKEY, OF EVANSTON, ILLINOIS, ASSIGNOR TO QUAKER OATS COMPANY, OF CHICAGO, ILLINOIS, A CORPORATION OF NEW JERSEY

SOLVENT FOR CELLULOSE NITRATE

No Drawing.   Application filed August 3, 1928.   Serial No. 297,370.

This invention relates to solvents for cellulose nitrate and it relates particularly to compositions of matter comprising cellulose nitrate and their solvents.

In my copending application Serial No. 161,470, filed January 15, 1927, I have described compositions of matter comprising cellulose esters and tetrahydrofurfuryl alcohol. I have discovered that the esters of this alcohol are excellent solvents for cellulose nitrate, and also that they possess other properties which make their use in lacquers highly advantageous.

As an illustration of the practice of this present invention, a formula for lacquer comprising a tetrahydrofurfuryl alcohol ester is given as follows; but it is to be understood that I am not to be limited to this specific illustrative formula:

| | Parts |
|---|---|
| ½ second R. S. cellulose nitrate | 10 |
| Ester gum | 8 |
| Dibutyl phthalate | 7 |
| Tetrahydrofurfuryl acetate | 6 |
| Butyl acetate | 27 |
| Butyl alcohol | 16 |
| Ethyl alcohol | 4 |
| Toluene | 22 |

It is to be understood that the above formula is given for illustrative purposes only and that other compositions and combinations can be used and still fall within the scope of my present invention. Whereas tetrahydrofurfuryl acetate has been employed in the illustrative formula cited, other esters of tetrahydrofurfuryl alcohol, such as the propionate, butyrate, benzoate or furoate, may be used.

The esters of tetrahydrofurfuryl alcohol are water white and stable in color, free from objectional odor, compatible with gum and resins and miscible with other solvents and diluents used in lacquer formulation. These properties particularly adapt these compounds to use as high boiling solvents in the preparation of lacquers.

While I have described my invention in one of its forms, it is to be understood that I do not desire to be limited to any of the specific details outlined above, since many modifications can be made therein without departing from the spirit and scope of the appended claims.

I claim:

1. A composition of matter comprising cellulose nitrate dissolved in an ester of tetrahydrofurfuryl alcohol.

2. A composition of matter comprising cellulose nitrate dissolved in an aliphatic ester of tetrahydrofurfuryl alcohol.

3. A composition of matter comprising cellulose nitrate dissolved in tetrahydrofurfuryl acetate.

4. A composition of matter composed of cellulose nitrate, and a gum dissolved in a solvent mixture therefor comprising an ester of tetrahydrofurfuryl alcohol.

5. A composition of matter composed of cellulose nitrate, and a gum dissolved in a solvent mixture therefor comprising an aliphatic ester of tetrahydrofurfuryl alcohol.

6. A composition of matter composed of cellulose nitrate, and a gum dissolved in a solvent mixture therefor comprising tetrahydrofurfuryl acetate.

7. A composition of matter comprising cellulose nitrate, a gum, and a plasticizer dissolved in a solvent comprising an ester of tetrahydrofurfuryl alcohol.

8. A composition of matter comprising cellulose nitrate, a gum, and a plasticizer dissolved in a solvent comprising an aliphatic ester of tetrahydrofurfuryl alcohol.

9. A composition of matter comprising cellulose nitrate, a gum, and a plasticizer dissolved in a solvent comprising tetrahydrofurfuryl acetate.

In witness whereof, I have hereunto subscribed my name.

JOHN P. TRICKEY.